United States Patent [19]

Suzuki

[11] 4,001,364

[45] Jan. 4, 1977

[54] METHOD FOR IMPROVING THE PHYSICAL PROPERTIES OF CERAMICS

[75] Inventor: Kazuo Suzuki, Otu, Japan

[73] Assignee: Kanegafuchi Kagaku Kogyo Kabushiki Kaisha, Osaka, Japan

[22] Filed: Mar. 21, 1975

[21] Appl. No.: 560,705

Related U.S. Application Data

[63] Continuation-in-part of Ser. No. 326,252, Jan. 24, 1973, abandoned, and a continuation-in-part of Ser. No. 329,992, Feb. 6, 1973, abandoned.

[30] Foreign Application Priority Data

Aug. 3, 1972  Japan .................... 47-58813
Sept. 1, 1972  Japan .................... 47-6763

[52] U.S. Cl. .................... 264/63; 65/18; 106/308 M; 252/62.63
[51] Int. Cl.² .................... C04B 35/64
[58] Field of Search .......... 264/63; 260/42.11; 106/272, 308 M; 252/62.63, 62.64; 65/18

[56] References Cited

UNITED STATES PATENTS

| 3,156,747 | 11/1964 | Burke | 264/63 X |
| 3,586,247 | 6/1971 | Perrins | 106/308 M |

FOREIGN PATENTS OR APPLICATIONS

| 988,475 | 4/1965 | United Kingdom | 264/63 |

*Primary Examiner*—Robert F. White
*Assistant Examiner*—Thomas P. Pavelko
*Attorney, Agent, or Firm*—Moonray Kojima

[57] ABSTRACT

A method of improving the physical properties, such as workability and impact strength, of ceramics, wherein particles of ceramics are coated with atactic polypropylene, subsequently formed into desired shape under compression and then sintered.

6 Claims, No Drawings

METHOD FOR IMPROVING THE PHYSICAL PROPERTIES OF CERAMICS

BACKGROUND OF THE INVENTION

This invention relates to a method of improving the physical properties of ceramics. This is a continuation-in-part of Ser. Nos. 326,252 filed Jan. 24, 1973 now abandoned and 329,992 filed Feb. 6, 1973, both of which are now abandoned.

For working ceramics, for instance, quartz glass, a fusion process has conveniently been employed. This process requires high temperatures, in some cases as high as 1,800° C. Accordingly, the type of heat source which is required to carry out the process is limited, and expensive. Thus, cost of working is high and production of the product is expensive. Moreover, when binders, such as camphor and polyvinyl alcohol, are used, a distinct disadvantage is produced in the way of malodour when the product is sintered. For these reasons, despite the excellent properties produced by this method, such as thermal expansion coefficient as high as $5-6 \times 10^{-7}$, which makes products produced thereby highly resistant to rapid heating and rapid cooling, excellent resistance to corrosion, ultraviolet ray penetration up to about 2,000 A, good elasticity performance, such products find limited application. For example, they can be used as special thermal instruments and vessels, chemical instruments and vessels, optical instruments and vessels for penetration of ultraviolet rays, precision spring, etc. Demand has been severely restricted.

SUMMARY OF THE INVENTION

The present inventors have widely investigated organic macromolecule binders which have no malodour; is convenient to handle; does not deteriorate their own properties, for instance, due to formation of cristobalite in case of quartz glass; and furthermore, can develope strength as a result of addition in a small amount. They have discovered a novel method of working ceramics by compression methods at a surprisingly much lower temperature as compared with the conventional methods. Moreover, the novel method enables production without deteriorating the advantageous characteristics such as those mentioned above.

The present invention comprises the step of coating each particle of ceramics with atactic polypropylene, subsequently forming the ceramic into a desired shape under compression, and then sintering.

DETAILED DESCRIPTION OF PREFERRED EMBODIMENTS.

Atactic polypropylene, is a waxy amorphous polymer low in molecular weight and in isotacticity (containing a small amount of substance high in isotacticity in some cases) by-produced when synthesizing isotactic polypropylene or crystalline polypropylene copolymer. This compound is gradually being used in more and different fields of application. However, it is mostly used for fuel and is the least expensive of all synthetic resins.

This substance may be synthesized by use of Ziegler-Natta catalysts. It may also be obtained by cracking polymers of high molecular weight.

The atactic polypropylene which is used exhibits an intrinsic viscosity $[\eta]$ of from 0.5 to 1.0 measured in tetralineat a temperature of 135° C. When it is used, moisture content is desirably only a trace or substantially zero. If moisture is present, a water layer may form on the surface of the shaped product when forming under pressure. This formation of water layer is a cause for cracking during sintering and is therefore undesirable.

When coating surfaces of ceramics, atactic polypropylene, melted or dissolved in hydrocarbon, such as heptane, is added to the ceramics while agitating. The order may be reversed. Heating and agitating are continued until coating is finished. By lowering the temperature afterwards, loose non-sticking powder is obtained.

It is desirable that ceramics to be used, do not tend to aggregate and be less than $5\mu$ in particle size, preferably $1\mu$. Such ceramics, for example, may be quartz glass, low soda alumina, magnesia clinker, electrofused magnesia, and ferrites, such as barium ferrite, strontium ferrite, lead ferrite, manganese-zinc ferrite, nickel-zinc ferrite, magnesium ferrite, magnesium-manganese-zinc ferrite, etc. The ferrite may be used singly or be combined. The term "ceramics" as used herein covers all such compounds.

The optimum quantity of atactic polypropylene which may be used for molding under compression varies with the type of and particle size of ceramic, and the presssure used for compression molding. As one example, in case of pressing 100 parts of quartz glass of $1\mu$ at room temperature under pressure of 200 kg/cm$^2$, 10 parts of atactic polypropylene is adequate. The pressure used for compression molding may range from 50 to 2,000 kg/cm$^2$. The higher the pressure the greater the amount of atactic polypropylene is reduced.

The details of the invention will now be illustrated with reference to actual examples, which examples are not to be construed in any limiting sense.

EXAMPLE 1

While agitating, 10 parts of melted atactic polypropylene ($[\eta]$ of 0.71) heated at 160° C was added to 100 parts of quartz glass of $1\mu$ in particle size. After coating adequately the surfaces of the particles with the polypropylene binder, the mixture was gradually cooled to obtain loose non-sticking powder.

Up to 30 g of this powder was placed in a mold of 50 m/m in diameter. At room temperature, a pressure of 200 kg/cm$^2$ was applied to obtain a cylindrical compression molding product. The thickness was 7.1 m/m. An iron mass of 300 g in load was dropped on this specimen from a height of 1.6 cm. Observation of its fracture (Du Pont's impact test) revealed that the specimen did not crack.

The specimen was placed in an electric furnace and the temperature was raised to 1,300° C in about 12.5 hours and then maintained at the same temperature for 30 minutes. The thickness of the sintered product was 7.0 m/m. The Du Pont's impact test did not cause cracking.

Products formed by the ordinary fusion process crack and their portions separate.

EXAMPLE 2

The same procedure was followed as in Example 1, except that low soda alumina (melting point 2,040° C) of $1\mu$ in particle size was employed as the ceramic and sintering temperature was 1,600° C.

The results were as follows:

|  | Thickness m/m | DuPont's Impact Test |
|---|---|---|
| Cylindrical compression molding product | 7.4 | did not crack |
| Sintered product | 7.4 | did not crack* |

*Product formed by fusion process did crack.

EXAMPLE 3

Following the procedure of Example 1, barium ferrite was added instead of quartz glass and of $1.08\mu$, in particle size. 4 g of the obtained powder was placed in a mold of 20 m/m in diameter. At room temperature, a pressure of 400 kg/cm$^2$ was applied to obtain a cylindrical compression molding product of 4 m/m thickness. The resultant product was placed in an electric furnace and raised in temperature to 1,100° C in about 2 hours and then maintained for 4 hours at the same temperature. No odor was noticeable. An iron lump of 50 g in load was dropped on this specimen and observation was made to determine the presence of cracks produced thereby (DuPont's impact test). The test resulted in cracks occuring and the specimen was broken when the height was over 8.75.cm.

When camphor was used in place of the atactic polypropylene, a strong odor was produced when being sintered. The duPont's impact test showed that cracks occured and the specimen was broken when the height was 2.5 cm. or more. There was a noticeable difference. This invention produced excellent improvement in impact strength.

The foregoing description is for purposes of illustrating the principles of this invention. Numerous other variations and modifications thereof would be apparent to the worker skilled in the art. All such variations and modifications are to be considered to be within the spirit and scope of the invention.

What is claimed is:

1. A method for improving the physical properties of ceramics, comprising the steps of coating 100 parts by weight particles of said ceramics with 5 to 10 parts by weight atactic polypropylene; forming the coated ceramics into desired shape under cold compression of 200 to 400 Kg/cm$^2$; and sintering the formed product at 1100° C to 1300° C, wherein said ceramic is barium ferrite or low soda alumina.

2. Method of claim 1, wherein said atactic polypropylene exhibits an intrinsic viscosity of 0.5 to 1.0.

3. Method of claim 1, wherein said atactic polypropylene is in melted form or dissolved in hydrocarbon.

4. Method of claim 1, wherein said coating is done while agitating and heating.

5. Method of claim 1, wherein said ceramics are particles of sizes less than $5\mu$.

6. Method of claim 5, wherein said sizes are less than $1\mu$.

* * * * *